Jan. 27, 1942.  N. C. PRICE  2,271,131
WASTE HEAT BOILER FOR AIRCRAFT
Filed May 1, 1939  2 Sheets-Sheet 1
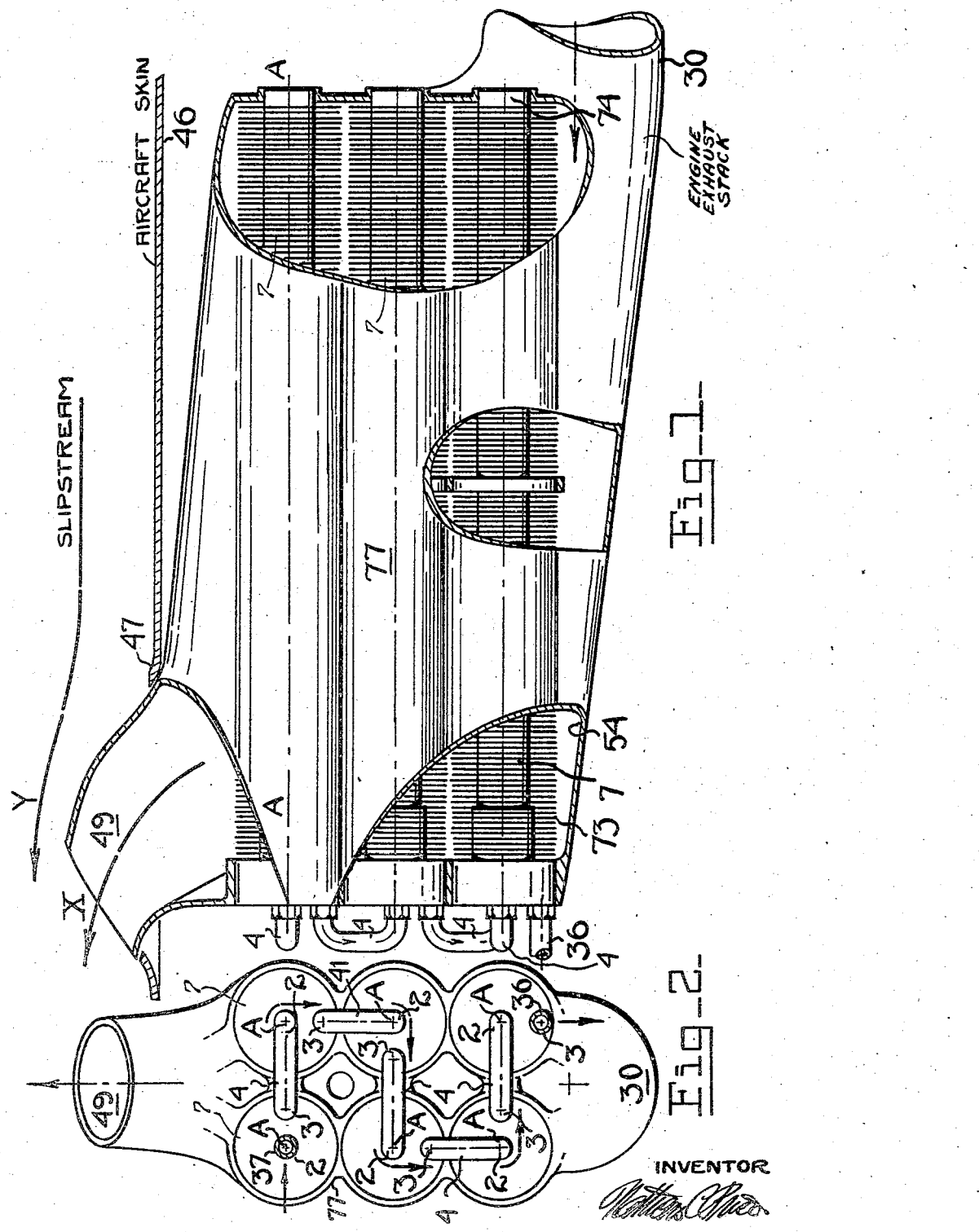
INVENTOR Jan. 27, 1942.    N. C. PRICE    2,271,131
WASTE HEAT BOILER FOR AIRCRAFT
Filed May 1, 1939    2 Sheets-Sheet 2
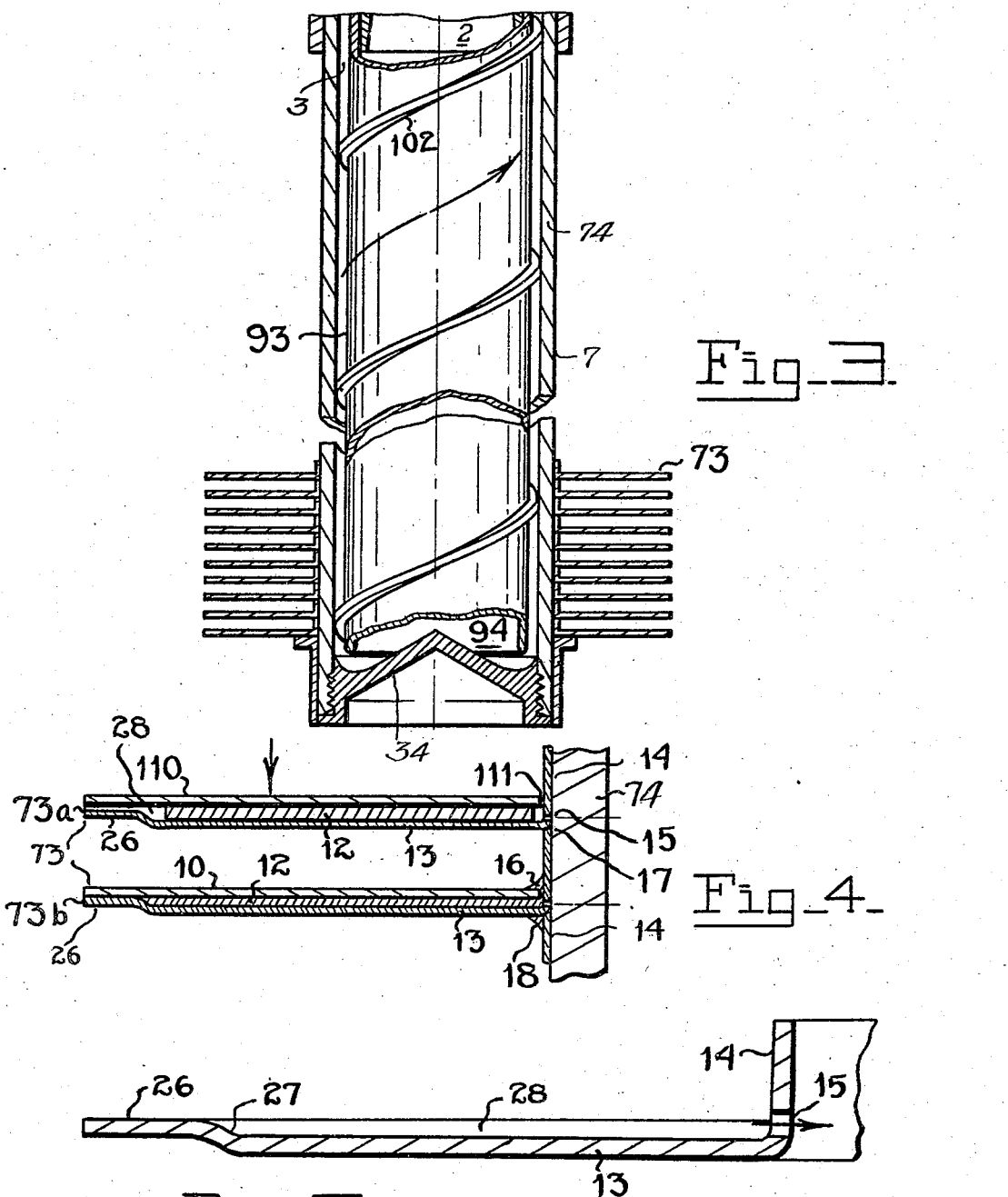
INVENTOR Patented Jan. 27, 1942

2,271,131

UNITED STATES PATENT OFFICE 2,271,131

WASTE HEAT BOILER FOR AIRCRAFT

Nathan C. Price, Seattle, Wash., assignor to Sirius Corporation, a corporation of California Application May 1, 1939, Serial No. 270,963

5 Claims. (Cl. 257—262)

The present invention is primarily useful as a means for generating working vapor, steam for instance, from waste heat liberated in the exhaust stacks of internal combustion engines. It enables the production of working vapor to be accomplished more efficiently for prime movers for any desired power purpose in an airplane, such as for engine supercharging, cabin supercharging, or auxiliary electric power.

It is an objective to provide a heat transfer construction which produces the least amount of back pressure in the engine exhaust stack and the greatest waste heat absorption from the exhaust gases, with a minimum weight of structure. Another objective is to provide a waste heat boiler which can withstand the severe vibrations, gas pulsations, and thermal stresses adjacent to an aircraft power plant installation. A still further objective is to provide a more efficient type of heating surface, which can be readily fabricated by production methods. A final objective of the invention is to provide a form of extended heat transfer surface with inherent thermal conductivity far greater than that of the heat resistant material forming the abrasion and corrosion resistant surface thereof, thereby capable of withstanding the presence of high velocity gases.

The invention can also be used in industrial applications for liquid heaters or vapor generators but its most outstanding applicability is in waste heat utilization in airplanes.

The foregoing and other objects of the invention have been attained in the embodiment of the invention illustrated in the drawings, in which:

Figure 1 is a representation of waste heat recovery structure of the new type viewed from the side.

Figure 2 is an end view of the same waste heat recovery structure as in Figure 1.

Figure 3 is a diagrammatic representation of a section, along the axis, of one of the heat transfer elements of Figure 1.

Figure 4 is a schematic representation of one side of the tube wall and its extended surface, along the axis of the boiler element of Figure 3.

Figure 5 is a schematic diagram of one portion of a tube fin, along the axis of the boiler element.

Figures 1 and 2 represent the type of installation wherein my form of boiler is particularly valuable. For example some boiler tube elements 7 are arranged in three superimposed pairs, bundled together in a generally rectangular and elongated boiler casing 54. The axes A of the elements 7 are parallel to the greatest length of the casing. Each element 7 is constructed from a relatively long tube 74 bearing numerous closely spaced fins 73 which are circular and transversely arranged with respect to the axes A.

The elements 7 have boiler fluid inlets 2 and boiler fluid outlets 3 which join in cross-over tubes 4 connecting the elements in series. A main liquid inlet 37 and a main vapor outlet 36 are provided. The elements 7 are swept by hot exhaust gas entering the bottom of the casing 54 from an engine exhaust stack 30. Ordinarily the exhaust gas is at a temperature of about 1400° F. and the gas velocity is 300 feet per second or more.

The gas is turned at right angles as it enters the space between the fins 73 and the sides 77 of the casing 54. After sweeping past the elements 7 the gas is expelled into a nozzle 49 diagonally opposite to the stack 30 in respect to the casing 54. The nozzle 49 extends through a cut-out 47 in the skin 46 of the aircraft. The nozzle 49 produces an exhaust gas jet, designated by the arrow X, substantially parallel to the slip-stream, designated by the arrow Y. Accordingly the nozzle produces comparatively small aerodynamic resistance and the jet results in a propulsive effect.

The sides 77 of the casing 54 are deeply corrugated to form circular envelopes for the edges of the fins 73. This creates an efficient path for the flow between the fins because the gas is required to pass close to the periphery of the tube 74 effectively sweeping the entire area of the fins.

The use of exhaust gas for jet propulsion requires a surplus pressure in the exhaust stack. Attendant with this gas pressure is an especially high resultant temperature inasmuch as the gas expansion cycle is not completed. For this reason my invention is of particular value in jet propulsion installations because of the high temperature durability offered. Indeed it has been found that conventional heat transfer surfaces will hardly endure in such installations more than a few hours due to the high temperature and high velocity abrasive action of the exhaust gases and carbon particles from the engine cylinder.

In Figure 3 the boiler element 7 is shown in greater detail. The boiler fluid is admitted from the inlet 2 into the interior of a co-axial spindle tube 93. The boiler fluid emerges from a bore 94 of the tube 93 as it impinges against an end plug 34. The fluid then reverses in direction and passes around the outer surface of the tube 93 in contact with the inner surface of the tube 74. A helical land 102 on the external surface of the spindle causes high velocity helical flow of the boiler fluid.

This rotational effect greatly increases the rate of heat transmission not only because of the high velocity produced but also because particles of liquid entrained in the boiler fluid are forced centrifugally against the bore of the tube 74. The rate of rotation of the boiler fluid about the axis A may be approximately 100,000 revolutions per minute.

The resulting rate of heat transmission is of such magnitude that conventional extended heat transfer surface cannot be used without eventual failure due to the tangential and radial thermal stresses where the extended surface joins the tube. The invention however maintains even distribution of temperature gradients in the extended surface so that spiral flow passage spindles can be employed within finned and shrouded boiler elements safely.

Figure 5 illustrates a portion of the fin 13 consisting of a circular disc 13 bearing a flange 27 which merges into an upwardly offset rim 26 parallel to the disc 13. An upturned circular flange 14 is formed at the center of the disc 13. A disc-shaped pocket 28 is thereby created. An orifice 15 is provided at the juncture of the flange 14 with the disc 13. The disc 13 is composed of a heat and corrosion resistant material, such as nickel, and is employed as a protective veneer for the lower side of the fin.

Figure 4 illustrates the flanges 14 pressed along the tube 74 in a pile, thereby spacing the fins 13. An unfinished fin 73a is illustrated as having a relatively thick copper ring 12 laid in the pocket 28 under a loose disc 10 of corrosion and heat resistant material, such as nickel. The disc 10 has an outer diameter equal to that of the rim 26, and an inside bore 11 slightly greater in size than the diameter of the flange 14 which it surrounds.

The fabrication process is undertaken in a controlled atmosphere furnace at approximately 2100° F. after which all the fins are changed in appearance from that of fin 73a to that of a completed fin 73b.

The ring 12 melts, thereby filling the pocket 28 and allowing the disc 10 to sink against the rim 26 so that these parts are sweated together. Likewise liquid copper flows upward by capillary action to form a fillet 16 between the bore 11 and the flange 14. Liquid copper also seeps through the orifice 15 sweating the flange 14 to the tube 74. Some of the copper from the orifice 15 forms a fillet 18 joining the bottom of the disc 13 to the flange 14 of the next lower fin.

The described fin structure yields high thermal conductivity due to the use of the copper filling, yet protection of the fin is provided by the veneer of corrosion and heat resistant metal. Copper has a thermal conductivity many times that of the best veneer materials. The copper filling permits the use of very thin fins of large diameter accompanied by only a very small temperature gradient from the periphery of the fin to the tube containing boiler fluid.

The copper filling increases the durability of the resistant metal veneer through equalization of temperature in a circumferential pattern thereby preventing buckling and cracking in the surface of the fin. It is found that the corrugated casing 54 closely encompassing the outer diameter of the fins becomes red hot, tending to prevent re-radiation from the outer edges of the heat resistant veneer, whereas the helical boiler fluid course within the tube 74 effectively cools the copper filling. Since the veneer has an inherently low thermal expansivity and the copper an inherently high thermal expansivity the described type of boiler casing and boiler helical fluid flow course minimize radial shearing stresses between the veneer and the copper filling which might otherwise arise through differential thermal expansion.

I claim:

1. In boiler heat exchange apparatus a thin walled tube having a plurality of spaced apart transverse fins thermally bonded thereto, each of said fins consisting of a disc of relatively high strength at elevated temperatures having a flange around its inner diameter, a second flat disc of relatively high strength at elevated temperatures spaced from said first disc, and a third disc of relatively high thermal conductivity between said first and second discs, said first and second discs cooperating to form a protective covering for said third disc and said tube.

2. Boiler heat exchange apparatus comprising a thin walled tube having a plurality of spaced apart transverse fins thermally bonded thereto, each of said fins consisting of a disc of high durability at elevated temperatures having flanges around its inner and outer diameters, a disc of high thermal conductivity and a third disc of high strength at elevated temperatures, said first and third discs cooperating to form a protective covering for said second disc and said tube.

3. In boiler heat exchange apparatus a thin walled tube having surface extending means comprising a plurality of transverse fins thermally bonded thereto, each of said fins consisting of a disc of high durability at elevated temperatures having an up-turned flange around its inner diameter and an off-set rim around its outer diameter, said flange and said rim cooperating to form an annular depression, a second flat disc of high thermal conductivity substantially filling said annular depression and a third disc of high durability at elevated temperatures cooperating with said first disc to form a protective covering for said second disc and said tube.

4. In boiler heat exchange apparatus, a boiler tube having a plurality of transverse fins thereon, each of said fins comprising a disc having an up-turned flange around its inner diameter and an off-set rim around its outer diameter, said flange and said rim cooperating to form an annular depression in said disc, a plurality of circumferentially spaced openings in said up-turned flange communicating with said annular recess, a second disc substantially filling said recess, and a third disc cooperating with said first disc to form a protective covering for said second disc and said tube, the entire assembly being bonded into a substantially integral unit.

5. In combination in a boiler, apparatus comprising a thin-walled tube having a plurality of spaced apart transverse circular fins thermally bonded thereto, each of said fins consisting of a disc of high durability at elevated temperatures and of relatively low thermal expansivity having a flange around its diameter, a second flat disc of relatively high strength at elevated temperature and of relatively low thermal expansivity spaced from said first disc and a third disc of relatively high thermal conductivity and of relatively high thermal expansivity between said first and second discs, said first disc and said second disc cooperating to form a protective covering for said third disc and said tube, a cylindrical shroud closely enveloping said fins over a substantial portion of the outer diameter of said fins, an inlet opening in said shroud for admitting hot gases of combustion to the space between said fins, an exit opening opposite said inlet opening in said shroud for allowing said gases to be expelled from the space between said fins, and a helical flow passage lying against the inner surface of said tube for transmission of boiler working fluid.

NATHAN C. PRICE.